(12) United States Patent
Zwiener et al.

(10) Patent No.: US 11,939,041 B2
(45) Date of Patent: Mar. 26, 2024

(54) METHOD FOR CONTROLLING AN AIRCRAFT, CONTROL DEVICE FOR AN AIRCRAFT AND AIRCRAFT WITH SUCH A CONTROL DEVICE

(71) Applicant: Volocopter GmbH, Bruchsal (DE)

(72) Inventors: Jan Zwiener, Waldbronn (DE); Jan-Hendrik Boelens, Bruchsal (DE); Benjamin Kirsch, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 267 days.

(21) Appl. No.: 17/202,519

(22) Filed: Mar. 16, 2021

(65) Prior Publication Data
US 2021/0284327 A1    Sep. 16, 2021

(30) Foreign Application Priority Data
Mar. 16, 2020  (DE) .......................... 102020107172.8

(51) Int. Cl.
| | | |
|---|---|---|
| *B64C 13/50* | (2006.01) | |
| *G06F 17/11* | (2006.01) | |
| *G05D 1/10* | (2006.01) | |

(52) U.S. Cl.
CPC ........... *B64C 13/503* (2013.01); *G05D 1/102* (2013.01); *G06F 17/11* (2013.01)

(58) Field of Classification Search
None
See application file for complete search history.

(56) References Cited

U.S. PATENT DOCUMENTS

| | | | | |
|---|---|---|---|---|
| 4,799,159 A | * | 1/1989 | Davidson | ................ G06F 11/16 |
| | | | | 701/14 |
| 5,996,941 A | * | 12/1999 | Surauer | .................. B64G 1/244 |
| | | | | 701/13 |
| 7,463,957 B2 | | 12/2008 | Kubica | |

(Continued)

FOREIGN PATENT DOCUMENTS

| | | |
|---|---|---|
| DE | 60111303 | 5/2006 |
| DE | 102017111527 | 11/2018 |
| EP | 1980924 | 10/2008 |

OTHER PUBLICATIONS

Wikipedia, Fly-by-Wire, https://de.wikipedia.org/w/index.php?title=Fly-by-Wire&oldid=193355155, 6 pages, Oct. 22, 2019.

*Primary Examiner* — Hongye Liang
(74) *Attorney, Agent, or Firm* — Volpe Koenig

(57) ABSTRACT

A method for controlling an aircraft, in particular a VTOL multirotor aircraft, in which flight influencing units of the aircraft a) are supplied with control commands via a first/control channel from a first computer (COM), which control commands originate or are derived from a pilot input (PE), and b) the control commands are monitored by a second/monitoring channel and a second computer (MON), which checks whether the control commands are suitable for a given physical state of the aircraft and the pilot input, c) the second computer determines whether a current navigation state of the aircraft coincides with the pilot input, which has been transformed into a desired navigation state of the aircraft, preferably by the second computer, within a prescribed deviation, and d) a control signal for controlling the aircraft is generated in dependence on a determination result of step c).

15 Claims, 4 Drawing Sheets

(56) References Cited

U.S. PATENT DOCUMENTS

| | | |
|---|---|---|
| 2007/0033195 A1 | 2/2007 | Stange et al. |
| 2011/0057071 A1 | 3/2011 | Sahasrabudhe et al. |
| 2011/0118906 A1 | 5/2011 | Fervel et al. |
| 2012/0078470 A1* | 3/2012 | Hirao ................ B60W 10/22 |
| | | 701/1 |
| 2012/0101663 A1* | 4/2012 | Fervel ................ B64C 13/505 |
| | | 701/3 |
| 2017/0192431 A1* | 7/2017 | Foster ................ G05D 1/0217 |
| 2020/0023955 A1 | 1/2020 | Worsham, II et al. |

* cited by examiner

METHOD FOR CONTROLLING AN AIRCRAFT, CONTROL DEVICE FOR AN AIRCRAFT AND AIRCRAFT WITH SUCH A CONTROL DEVICE

INCORPORATION BY REFERENCE

The following documents are incorporated herein by reference as if fully set forth: German Patent Application No. 10 2020 107 172.8, filed Mar. 16, 2020.

TECHNICAL FIELD

The invention relates to a method for controlling an aircraft, in particular a vertical take-off and landing multirotor aircraft, in which flight influencing units of the aircraft, in particular drive units, preferably electrically driven drive units, and/or control surfaces, are supplied with control commands via a first channel (control channel) from a first computing unit (COM), which control commands originate from a pilot input or are derived from a pilot input, and in which the control commands are monitored by a second channel (monitoring channel) and a second computing unit (MON).

The invention also relates to a control device for an aircraft, in particular a vertical take-off and landing multirotor aircraft, with a first computing unit (COM) and with a first channel (control channel) for supplying flight influencing units of the aircraft, in particular drive units, preferably electrically driven drive units, and/or control surfaces, via the control channel with control commands from the first computing unit (COM), which control commands originate from a pilot input or are derived from a pilot input, and with a second channel (monitoring channel) and a second computing unit (MON), which second computing unit (MON) is designed and intended to monitor the first computing unit (COM), in order in particular to detect faults or faulty behavior in the first computing unit.

Finally, the invention also relates to an aircraft, in particular a vertical take-off and landing multirotor aircraft, with a number of flight influencing units, in particular drive units, preferably electrically driven drive units, and/or control surfaces, and with a control device.

BACKGROUND

Generally, the present invention is concerned with the monitoring of functions that are used in the course of the flight control or generally in the operation of an aircraft or aerial vehicle and therefore have great relevance to safety.

Such functions may be implemented in particular in the form of software routines or algorithms and influence any type of (control) sequences of the aircraft. They must be regularly and repeatedly monitored for their proper function, in order that the aircraft can be operated safely.

This comprises—without restriction—the stabilization, navigation, braking, landing approach (in particular monitoring of the landing corridor), all internal control circuits, such as for example the hydraulics, the engine monitoring or the electric motor monitoring.

The "classic" form of such monitoring that is used as standard in aviation generally duplicates the function to be monitored, i.e. each function is present or implemented at least twice. Both functions, that is to say the function to be monitored and its "duplicate", are often, but not necessarily, already implemented in production by various teams, which possibly use individual processes and hardware to avoid the occurrence of common faults that endanger the operational safety of both functions in the same way. A component of the aircraft that provides the function(s) concerned is usually referred to as the "command" (COM for short) and the associated monitoring component is usually referred to as the "monitor" (MON).

COM is the only component that is allowed to communicate with the other components of the aircraft or the drive outputs, that is to say transmit control commands. "Drive outputs" refers to those control outputs by which control commands are transferred to the flight influencing units of the aircraft, in particular to the drive units, preferably electrically driven drive units, and/or to the control surfaces, in order to influence the movement of the aircraft. MON may only receive inputs or incoming signals (input) and end the ability of COM to generate or connect control outputs (i.e. corresponding control signals). In this way, a fault in one of these two components (COM or MON) leads to the deactivation of both components and to a loss of the functionality provided by COM.

There are several problems that arise from the classic monitoring approach and are obvious when considering the life cycle of an aircraft or aircraft.

Concept and Planning

Firstly, a fault occurring during the concept and planning phase cannot be intercepted because the monitoring is only part of the later development stages. Often, the "aircraft" system is not monitored at a superordinate level, but instead the monitoring only concerns functions and sub-functions. The monitor can in principle only detect such faults that are taken into account in its conception.

Specification

Secondly, there is the requirement that the COM and MON functions have to be provided by different personnel. If the same personnel develop the COM and MON functions, this can lead to a common fault, since it is probable that the same personnel make the same mistakes both in COM and in MON for the similar parts of the function.

Design

Thirdly, a partially common specification leads to a draft with possible common faults if it is performed by the same persons.

Integration and Installation (Including Common Mode)

Furthermore, integration or installation faults cannot in principle be detected by classic monitoring. This concerns in particular so-called common mode failure (CMF) known to a person skilled in the art. This is understood in risk analysis as meaning the failure of a number of identical components or operating means, the failure of which leads to a damaging event. These are faults that do not have a common cause. The term CMF should therefore be differentiated from common cause failure (failure due to the same underlying cause).

Operation and Maintenance

During operation, the classic monitoring approach deals with faults or failures by deactivating the function. This approach therefore relies heavily on the redundancy of the function that is provided by another component. It does not prevent the failure being able to occur in the first place, in particular due to aging or wear. Classic monitoring does not support maintenance activities, since it assumes that failures occur purely coincidentally.

Disposal and Service Life Extension

Finally, no relevant data for supporting service life extension of the functions concerned can be obtained from the classic monitoring approach.

SUMMARY

The invention is based on the object of remedying this and providing a method for controlling an aircraft, in particular a vertical take-off and landing multirotor aircraft, a control device for such an aircraft and such an aircraft itself comprising a novel form of monitoring, such that it does not just provide that, in the event of a fault in one of the two systems (COM or MON), it deactivates both systems and brings about the loss of the function provided by COM.

The invention achieves this object by a method with one or more of the features disclosed herein, by a control device with one or more of the features disclosed herein, and by an aircraft with one or more of the features disclosed hereon. Preferred developments are defined below and in the claims.

According to a first aspect of the invention, it provides a method for controlling an aircraft, in particular a vertical take-off and landing multirotor aircraft, in which flight influencing units of the aircraft, in particular drive units, preferably electrically driven drive units, and/or control surfaces a) are supplied with control commands via a first channel (control channel) from a first computing unit (COM), which control commands originate from a pilot input or are derived from a pilot input, and in which
b) the control commands are monitored by a second channel (monitoring channel) and a second computing unit (MON), which second computing unit checks whether the control commands are suitable for a given physical state of the aircraft and the pilot input, in that
c) it is determined by the second computing unit (MON) whether a current navigation state, which corresponds to the physical state of the aircraft or represents this state, coincides with the pilot input, which pilot input has been transformed into a desired navigation state of the aircraft (that is to say a physical state of the aircraft desired according to the pilot input), preferably by the second computing unit (MON), within a prescribed deviation, and in which
d) a control signal for controlling the aircraft is generated in dependence on a determination result of the determination in step c).

The control signal may be a fault signal which indicates an inadmissible deviation of the desired navigation state from the current navigation state.

Said physical state of the aircraft (actual state) is preferably determined by sensors suitable for this, which sensors may comprise without restriction IMUs (inertial measuring units), radar, lidar, optical sensors, cameras and the like.

The pilot input may originate from a human pilot, or it may be generated by an automaton (autopilot).

The pilot input is transformed, i.e. computationally converted, in order to be able to compare it with the determined actual state.

Generally, the control signal generated in step d) will bring about continued normal operation of the aircraft if the determination in step c) finds that the deviation remains within prescribed limits; otherwise, the control signal generated in step d) may bring about a termination or an alteration of the normal operation of the aircraft and/or the display/output of a warning message.

According to a second aspect of the invention, it provides a control device for an aircraft, in particular a vertical take-off and landing multirotor aircraft, with a first computing unit (COM) and with a first channel (control channel) for supplying flight influencing units of the aircraft, in particular drive units, preferably electrically driven drive units, and/or control surfaces, with control commands via the first channel from the first computing unit (COM), which control commands originate from a pilot input or are derived from a pilot input, and with a second channel (monitoring channel) and a second computing unit (MON), which second computing unit (MON) is designed and intended to monitor the first computing unit (COM), in that the second computing unit checks whether the control commands are suitable for a given physical state of the aircraft and the pilot input, in that the second computing unit (MON) is designed to determine whether a current navigation state of the aircraft coincides with the pilot input, which pilot input has been transformed into a desired navigation state of the aircraft, preferably by the second computing unit (MON), within a prescribed deviation, and in which the second computing unit (MON) is also designed to generate and output a control signal for controlling the aircraft in dependence on a determination result of the determination.

Such a control device according to the invention is capable of performing the method according to the invention.

Said current navigation state of the aircraft (the actual state) can be expressed mathematically or in technical control-related terms by a navigation state vector.

According to a third aspect of the invention, it provides an aircraft, in particular a vertical take-off and landing multirotor aircraft, which is equipped with a number of flight influencing units, in particular drive units, preferably electrically driven drive units, and/or control surfaces, and with a control device according to the invention, which control device is operatively connected to the flight influencing units and designed to send control commands to the flight influencing units.

Such an aircraft may be operated or controlled by the method according to the invention.

The drive units are advantageously electrically operated motor/rotor arrangements arranged in a distributed manner. Preferably, the aircraft has a multiplicity of such drive units, for example 18, which may be arranged in one plane.

The term "flight influencing units" also includes however other units that can influence a flying behavior of the aircraft, such as for example (active) payloads, cable winches or the like, but in particular also control surfaces, such as for example slats, flaps, ailerons or stabilizers (if adjustable).

Various differences and advantages with respect to the prior art arise within the scope of the invention:

Concept and Planning

Firstly, the conception of the proposed monitoring may be performed independently of the development stage of the aircraft. It also allows retrofitting of existing aircraft.

Specification

Secondly, the type of monitor provided is by nature different than according to the prior art. It is not based on the duplication of a function, every effort being made in principle to avoid mistakes that are made being copied. The invention aims to exploit the different nature of the monitor. Furthermore, by adding context, which forces a different perspective to be taken in viewing the monitoring problem, the specification of the monitor (second computing unit) by nature cannot have the same faults as the command unit (first computing unit), even if it is developed by the same personnel. "Adding context" is meant in particular to mean that information beyond the state vector is used. That may be on the one hand (physical) limits of the state vector, but also further states, or relationships between the states (for example if state A=10, then state B<=5).

Design

Thirdly, because of completely different specifications, the proposed monitor requires a different design, even if the same persons develop it. If a specific function is monitored, the design of the monitor requires a deeper understanding of the function, in that the failure modes are thoroughly analyzed, which can even lead to an improvement of COM if an iterative approach is used. This may include that the context described above must be known, that is to say that information beyond the state vector is used. There may once again be (physical) limits of the state vector, but also further states, or relationships between the states (see above).

Integration and Installation (Including Common Mode)

Furthermore, some integration and installation faults, in particular systematic faults, may be discovered by the proposed monitoring scheme. Systematic faults can scarcely be avoided and generally require different employees carrying out the same action or an additional verification step. The inclusion of context information (see above), which with the classic approach is not available to the COM or the MON, can be used to discover these. For example, if in the event of incorrect installation, relationships of states behave differently in relation to one another than expected. For example, with an installation error of 180°, an adjusting signal is generated in the positive direction, but a negative movement is made.

Operation and Maintenance

Furthermore, maintenance measures can potentially be derived from the proposed monitoring scheme. The proposed scheme not only aims to detect coincidental failures, but can also characterize the deterioration or wear of a function, which ultimately leads to a fault or failure if appropriate measures are not taken. This applies in particular to sensor-related functions, that is to say functions that are based on sensor signals, such as for example the monitoring of a motor by a temperature sensor. Sensors generally undergo aging, and the prior art often specifies the use of filters, which improve the signals but can conceal an aging problem of the sensors. In the present case, an aging of the sensors or an aging of the fastening of the sensors can be discovered by the sensor outputs (signals or measured variables), since for example the noise, the bias or the measured amplitudes—indicating scaling errors—may differ significantly between different wings.

Disposal and Service Life Extension

By analogy with the procedure outlined, which can be used for maintenance measures and concerns the aging process of functions, service life extension can be supported by the targeted, prompt exchange of functions when their aging is detected.

In the case of a development of the method according to the invention, it is provided that, in step c), at least one of the following navigation state attributes of the navigation state is checked in the course of the comparison of the actual state and pilot input, for which recourse can be made to corresponding sensor signals:

the position in flight of the flying vehicle, for example on the basis of Euler angles;
rotational speeds;
change in rates of rotation;
position;
altitude (in particular barometric);
speed with respect to the air and/or ground;
acceleration.

The above enumeration is not exhaustive. Any measured/measurable or derivable (from a measurement) feature or attribute of the navigation state may be used in principle for the check in c). In this way, in particular a given function can be monitored in various ways.

In the case of another development of the method according to the invention, it is provided that it is additionally checked, preferably by the second computing unit, by a reverse control assignment, whether the control commands during an activation of the flight influencing units of the aircraft lead to a first force/moment vector $\tau_{Cmd}$ for the aircraft, which first force/moment vector is suitable, in particular with regard to its direction and/or its amount, for a given physical state of the aircraft, in that i) the first force/moment vector, derived from the control commands, is compared with a second force/moment vector $\tau_{MON}$, which second force/moment vector is determined independently of the first force/moment vector, in particular by the second computing unit, and/or in that ii) it is checked for the first force/moment vector, preferably by the second computing unit, whether the axis and/or the amount of a torque contained in the first force/moment vector lies within a prescribed tolerance interval, and/or in that it is checked for the first force/moment vector, preferably by the second computing unit, whether the first force/moment vector coincides with the pilot input within a prescribed deviation, and in which, in step d), an adapted control signal for controlling the aircraft is generated in dependence on a checking result of the check in steps i) to iii).

Steps i) to iii) can be carried out individually or in any combination in addition to the check according to claim 1 and can consequently detect malfunctions that have escaped the checking there. Conversely, steps i) to can have the effect that detected apparent malfunctions are subsequently classified as tolerable.

A corresponding, preferred development of the control device according to the invention provides that the second computing unit is also designed to check by a reverse control assignment whether the control commands during an activation of the flight influencing units of the aircraft lead to a first force/moment vector which is suitable, in particular with regard to direction and/or amount, for a given physical state of the aircraft, in that the second computing unit is designed i) to compare the first force/moment vector, derived from the control commands, with a second force/moment vector, which second force/moment vector is determined independently of the first force/moment vector, in particular by the second computing unit, and/or ii) to check for the first force/moment vector whether the axis and/or the amount of a torque contained in the first force/moment vector lies within a prescribed tolerance interval, and/or to check for the first force/moment vector whether the first force/moment vector coincides with the pilot input within a prescribed deviation, and to generate and output an adapted control signal or fault signal for controlling the aircraft in dependence on a checking result of the check according to steps i) to iii).

Specifically, in the case of another development of the method according to the invention, it may be provided that the first force/moment vector $\tau_{Cmd}$, derived from the control commands, is given by the relationship:

$$\tau_{Cmd} = \underbrace{\begin{pmatrix} \overline{m}_1^b & \overline{m}_2^b & \cdots & \overline{m}_N^b \\ \overline{f}_1^b & \overline{f}_2^b & \cdots & \overline{f}_N^b \end{pmatrix}}_{K} \cdot \underbrace{\begin{pmatrix} \Omega_1^2 \\ \Omega_2^2 \\ \vdots \\ \Omega_N^2 \end{pmatrix}}_{\Omega}$$

with a matrix K, the elements $m_i^b$, i=1 ... N, and $f_i^b$, i=1 ... N, of which are given by a configuration of the aircraft and its N flight influencing units, and with a vector $\Omega$ with the control commands of the first computing unit for the N flight influencing units.

Furthermore, in the case of yet another development of the method according to the invention, it may be provided that, in step c) and/or in steps i) to a plurality of checking/comparison methods are respectively used in order to obtain a corresponding plurality of checking/comparison results, which checking/comparison results are subsequently respectively weighted and then combined with one another in order to obtain a combined determination result and/or a combined checking result for use in step d).

In this way, the certainty of the monitoring can be improved, since specific advantages of the various checking/comparison methods supplement one another and certain problems can be compensated.

A corresponding development of the control device according to the invention provides that the second computing unit is also designed to use a plurality of checking/comparison methods in order to obtain a corresponding plurality of checking/comparison results, which checking/comparison results are subsequently respectively weighted and then combined with one another in order to generate a combined determination result and/or a combined checking result and output it to generate the control signal or the adapted control signal.

Furthermore, in the case of another development of the method according to the invention, it may be provided that each checking/comparison method from the plurality of checking/comparison methods is assigned at least a first weighting factor and at least a second weighting factor, the first weighting factor and the second weighting factor being combined to form an overall weighting factor for each checking/comparison method, with which overall weighting factor the associated checking/comparison result is weighted.

Also in this way, the result of the monitoring can be further refined and improved.

A development of the method according to the invention provides in this connection that the first weighting factor and the second weighting factor for each checking/comparison method are multiplied by one another.

Another development of the method according to the invention provides in this connection that a sum is formed from the plurality of weighted checking/comparison results in order to obtain the combined checking result for use in step d).

Yet another development of the method according to the invention provides in this connection that the first weighting factor is a severity weighting factor, which indicates how severe a fault that can be detected by a given checking/comparison method is or could be for the aircraft or its control.

Yet another development of the method according to the invention provides in this connection that the second weighting factor is a confidence weighting factor, which indicates how accurately a fault that can be detected by a given checking/comparison method can be quantitatively specified for the aircraft or its control.

A preferred development of the method according to the invention provides that the checking/comparison methods are chosen from a group comprising the following methods: frequency analysis; Kalman filters; CBIT and PBIT results [Continuous Built-In Test/Periodic Built-In Test]; out-of-range assessments (for example flight envelope); expected values from models (for example pilot model). This enumeration should be understood as not exhaustive.

Faults, in particular due to aging, can be manifested for example by a shift of the frequency and correspondingly detected by a frequency analysis.

Processes can be estimated while assuming known process properties in order to obtain expected values. If these expected values deviate significantly from the measured values, there may be a fault, which can be detected by a Kalman filter.

CBIT includes continuous checking of certain functionalities or parameters. The same applies to PBIT, preferably restricted to the powering-up time.

Out-of-range assessment may be based on defaults and empirical values: if the aircraft may/should have a maximum pitch of 10°, but the pitch is 13°, there is probably a fault.

The same applies to empirical values from models: if for example a specific motor speed that has been commanded by a flight controller is also implemented, the aircraft should experience a certain change in position according to the model. If the aircraft reacts differently, there is probably a fault.

Other developments of the control device provide that the second computing unit is also designed for implementing a method according to one of the developments mentioned of the method according to the invention.

As already described in essence further above, the so-called lane computer flight control MONITOR (MON, also referred to as "MON-Lane" below), i.e. the second channel (monitoring channel) with the second computing unit, continuously validates during operation the output of the COMMAND (COM) lane computer ("COM-Lane" or control channel with the first computing unit) on a higher level than usual. This means that the MON lane computer (second computing unit) not only checks whether COM-Lane computer generates an output according to a specified control law (checking for implementation errors), but also validates whether COM-Lane computer actually generates outputs that lead to a stable and desirable behavior of the aircraft (checking for design faults).

Generally, the correct implementation of a mathematical-physical flight control law is verified by following the respective development backup process. Faults in the design and in the requirements specification are however difficult to detect by a purely verification-based approach, since the output of the flight control law, i.e. a corresponding control command, can always still be erroneous. The proposed extended checking scope of MON-Lane (second channel with second computing unit) comprises method steps for validating the calculated flight control law outputs—that is to say method steps which can check whether the calculated output of COM-Lane (control commands of the first computing unit on the first channel) is suitable for the given actual state of the aircraft and the given pilot commands.

A first approach on which the invention is based comprises a basic check on the state of the aircraft. The basic approach comprising judging whether the current state of the aircraft coincides with the input command of the pilot (pilot input). The input variables for this basic check are the aircraft navigation state (the actual state of the aircraft; indicated in particular by an aircraft navigation state vector) and the pilot input command (the pilot input), the pilot input having been transformed ("translated") into a desired navigation state.

In particular, the following navigation state attributes can be checked by this method, which has already been referred to further above: position in flight (for example as the Euler angle), rotational speeds, change of the rates of rotation, position, altitude, speed (with respect to the air and/or ground), acceleration.

If for example the pilot commands a certain angle of inclination for a multirotor aircraft, but the multirotor aircraft does not reach the desired angle of inclination in a specific timeframe, this may lead to the conclusion that the underlying flight control law is not functioning correctly. In an extreme case, this may even have to be accepted irrespective of the pilot command, since for example an (actual) position in flight with a rolling angle of +/−90° and/or a pitching angle of +/−90° is, by definition, not a safe position for a multirotor aircraft. In this case, therefore, a corresponding correction control signal or a fault signal would be generated.

This first approach generally leads to laws that are simple to implement, at least in comparison with traditional COM/MON approaches, which require completely independent implementation of the same requirements. However, it is possibly not sufficient for practical application, since external forces that act on the aircraft (for example wind) or faulty behavior of the flight influencing units (actuators) may also bring the aircraft into a state that is not desirable. This should not lead the MON-Lane directly to the conclusion that the COM-Lane is calculating a faulty output, therefore as such is malfunctioning. To this extent, the question additionally arises as to whether the output of the COM-Lane is appropriate for the current state of the aircraft and the control command of the pilot. In a development of the basic concept of the invention, this leads to a refined method:

The refined method—as likewise already described in essence further above—includes a validation of the control output. This is a check in the MON-Lane, i.e. by the second computing unit. This preferably continuously reads the current control output (control commands $\Omega$) from COM (first computing unit) to the flight influencing units (actuators) and carries out an inverted N control assignment (allocation) with a matrix K, in order to see whether the control commands lead to a vector $\tau_{Cmd}$ of torques and forces which is suitable for a given situation or a given state, in particular for a given state deviation from the pilot reference or else also from the flight envelope (envelope). The checking preferably comprises an analysis of the direction and the size (amount) of the vector $\tau_{Cmd}$. A specific example of such a vector has been given further above.

The control commands of the first computing unit COM therefore represent setpoint output values, denoted above by $\Omega$. The setpoint vector $\tau_{Cmd}$, which is derived from the setpoint output values $\Omega$, can be compared with a vector $\tau_{MON}$ calculated independently thereof by the monitoring lane (second channel with second computing unit). This can be realized in various ways, for example as a simple threshold value comparison or else by a check of the axis angle rotation. The check of the axis angle rotation would then detect whether the axis of the desired torque lies plausibly within a prescribed tolerance and whether the size (the amount) of the torque is appropriate.

For example, it could happen that an aircraft assumes an angle of inclination of +80° (which would contravene the check according to the first approach or trigger a corresponding signal of the second computing unit—the pilot input does not ask for such an angle). If however the commanded torque and force vector (the setpoint vector $\tau_{Cmd}$) points here in a direction that corresponds to the command of the pilot (the pilot input), then a fault in the command unit (first computing unit) is improbable. In this scenario, it should rather be assumed that external forces have caused the aircraft to get into an undesired position in flight. However, the COM-Lane evidently reacts appropriately to this given scenario, and another control law would probably not improve the overall safety. Here it is therefore advantageous if the monitoring subsequently comes to the conclusion that, contrary to the first approach, no intervention in the operation of the first computing unit is required.

In the case of the proposed monitoring scheme, as explained above, there are several approaches as to how possible abnormal functional behavior can be determined. If however reliance is placed on only one of the monitoring methods to judge whether a function has abnormal behavior, this can lead to an excessive number of false-positive results. "False-positive" means in this connection that a fault is detected by the second computing unit, but the function is performed within the expected tolerance range (envelope or envelope curve). False-positive results are normally the result of too conservative an envelope curve definition due to adding an excessive safety margin. The use of more than one monitoring method and the use of an OR gate for reaching a decision even makes the situation even worse. The contrary is the case if an AND gate is used for reaching a decision. The result would be that abnormal behavior could often remain undetected.

In the present case, a weighting scheme that combines the various methods to form an overall picture is proposed as an additional development to supplement the methods already discussed. The weightings are defined by the assessment of the severity of the safety effect that the given method can detect. The following Table 1, given by way of example, is used for purposes of explanation. It provides the first weighting factor mentioned further above.

TABLE 1

| Degree of severity and severity weight | |
| --- | --- |
| Effect of the established degree of severity | Severity weight |
| No effect | 0 |
| Minor effect | 1 |
| Major effect | 10 |
| Dangerous effect | 100 |
| Catastrophic effect | 1000 |

The second weighting (second weighting factor, see above) depends on the type of (decision-making) methods that are used for detecting the abnormal function. If it is a binary decision, the weight is 0 if the function is functioning as expected, and 1 if abnormal behavior is observed. If however the applied method has a confidence value for the detection of abnormal behavior that is graduated or can be given steplessly (for example a Kalman filter), this value can be normalized to the range from zero to one [0, 1] and used as a so-called confidence weight. The proposed second (confidence) weights are summarized in Table 2.

TABLE 2

| Method and confidence weight | |
|---|---|
| Method | Confidence weight |
| Binary | 0 or 1 |
| Confidence range | 0 to 1 |

A rating of the monitored function is obtained by multiplication of the confidence weight by the severity weight and summation over all of the methods applied. The decision as to whether this function is operating normally or abnormally can be made by defining a threshold value. If the sum of the weighted individual methods lies above the defined threshold value, the function is identified as not operating normally. If the sum of the weighted individual methods lies below the defined threshold value, the function is identified as operating normally.

BRIEF DESCRIPTION OF THE DRAWINGS

Further properties and advantages become apparent from the following description of exemplary embodiments with reference to the drawing.

DETAILED DESCRIPTION

Figure 1:
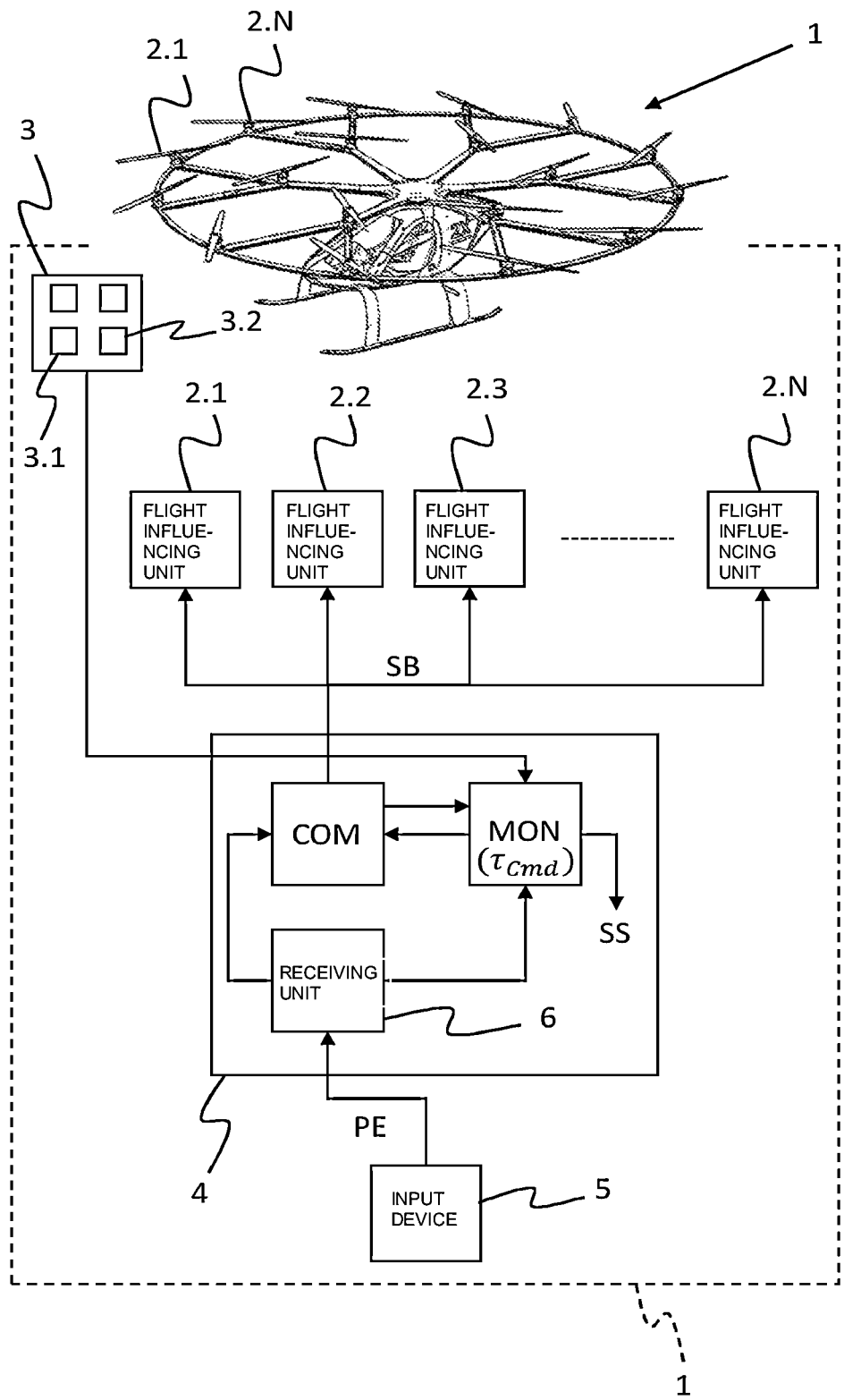
FIG. 1 schematically shows, on the basis of a block diagram, an aircraft according to the invention with a control device according to the invention.

In FIG. 1, an aircraft in the form of a vertical take-off and landing multirotor aircraft, specifically a multicopter, is represented at reference sign 1. The box indicated by dashed lines symbolizes said aircraft 1 on a more abstract plane.

The aircraft 1 comprises a plurality of N flight influencing units 2.1, ..., 2.N, which take the form of electrically driven drive units in the form of motor/rotor units. Reference sign 3 denotes sensors for determining an actual state of the aircraft 1. The sensors 3 may comprise a number of sensor units 3.1, 3.2, ..., which are formed as sensor units 3.1, 3.2, ... of various types. Temperature sensors, revolution counters, inertial measuring units, cameras, radar, lidar and the like may be mentioned here by way of example and without restriction. As a departure from the schematic representation in FIG. 1, the sensors 3 may be arranged on the aircraft 1 in a distributed manner. For example, some of the sensor units 3.1, 3.2, ... may be assigned directly to the individual flight influencing units (drive units) 2.1, 2.2, ... and be arranged at them.

Reference sign 4 denotes a superordinate flight controller or flight control device of the aircraft 1. The flight control device 4 receives a pilot input PE from a corresponding input device 5, for example a joystick. The pilot input PE is not restricted to the input of a human pilot. In particular, the input device 5 may also be an autopilot, some other automatic input device, or a remote control signal.

According to the schematic representation in FIG. 1, the flight controller 5 comprises a first (control) channel with a first computing unit COM (COM-Lane) and a second (monitoring) channel with a second computing unit MON (MON-Lane). The first computing unit COM is also referred to as the command, while the second computing unit MON is also referred to as the monitor. The pilot input PE goes first to a receiving unit 6, which prepares the pilot input in signaling terms and makes it available to COM. COM calculates control commands SB therefrom, which it makes available to the flight influencing units 2.1, ..., 2.N. MON monitors COM, in particular the control commands SB generated by COM, and in this connection receives here in particular signals from the sensors 3, as represented. In dependence on a result of the monitoring, MON generates a control signal SS, which can be used in the flight controller 4 in various ways for controlling the aircraft 1. This has already been described in detail further above. In particular, MON can check whether the control commands SB are suitable for a given physical state of the aircraft 1 and the pilot input PE, in that MON determines on the basis of the sensor signals a current navigation state of the aircraft 1 and compares it with the pilot input PE. For this purpose, the unit 6 is also in operative connection with MON, as represented. In this way, MON "knows" the pilot input PE or a transformation of the same into a desired navigation state of the aircraft 1, which desired navigation state is to be compared with the current navigation state of the aircraft 1.

In addition or as an alternative, MON can check by a reverse control assignment whether the control commands SB during an activation of the flight influencing units 2.1, ..., 2.N of the aircraft 1 lead to a first force/moment vector for the aircraft, which vector is suitable for a given physical state of the aircraft 1. This has also already been discussed in detail further above. In particular, MON can determine the said force/moment vector $\tau_{Cmd}$ from the control commands SB, as represented, and compare it with a second force/moment vector $\tau_{MON}$, which second force/moment vector is determined independently of the first force/moment vector. MON calculates the second force/moment vector independently on the basis of the pilot input PE and the sensor signals (measurements).

Figure 2:
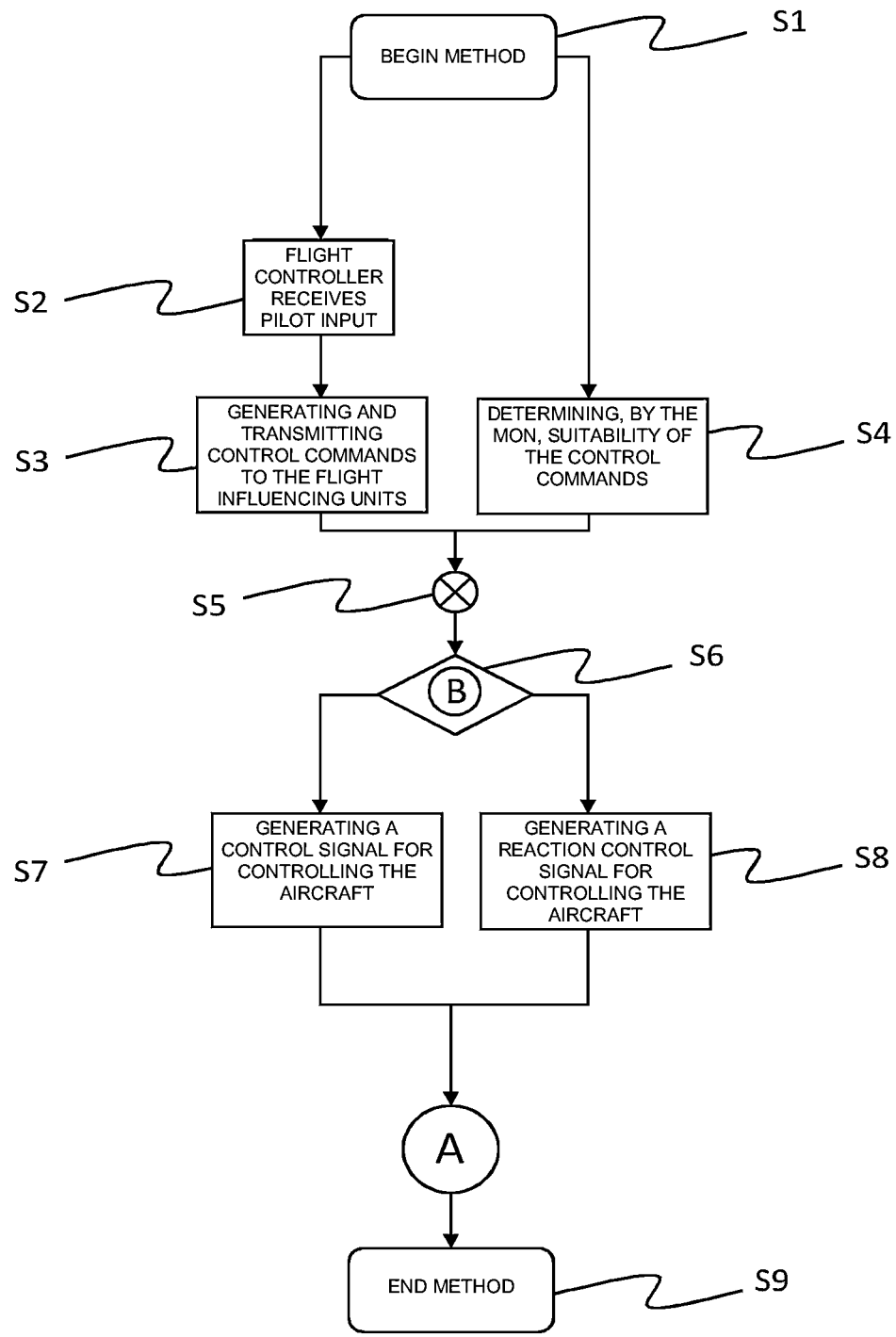
FIG. 2 shows a flow diagram of a first refinement of the method according to the invention for controlling an aircraft.

FIG. 2 shows a first flow diagram of a method. The letters A and B contained in the flow diagram denote branches (developments of the method), which will be discussed more specifically further below on the basis of FIGS. 3 and 4.

The method according to FIG. 2 begins with step S1. Proceeding from there, two parallel strands of the method exist. According to step S2, the flight controller 4 (cf. FIG. 1) receives the pilot input PE (cf. FIG. 1) and generates from it control commands SB (cf. FIG. 1) for the flight influencing units 2.1, ..., 2.N (FIG. 1) of the aircraft 1 (FIG. 1), which are transmitted to the flight influencing units in step S3. This takes place via the COM channel. Parallel to this, MON determines in step S4 whether the control commands are suitable for a given physical state of the aircraft and for the pilot input. For this purpose, MON determines in step S4, in particular on the basis of the sensor data or sensor signals (cf. FIG. 1), whether a current navigation state of the aircraft coincides with the pilot input. The monitoring of COM by MON is symbolized in FIG. 2 at reference sign S5. Subsequently, the check already referred to in step S6, of whether the current navigation state of the aircraft coincides with a desired navigation state of the aircraft, which results from the pilot input, within a given deviation, is performed. The comparison in step S6 may take place in various ways (branch B), which is explained more specifically further below on the basis of FIG. 4.

If it is found from the comparison in step S6 that there is a coincidence within the prescribed deviation, a control signal for controlling the aircraft is generated in step S7, which in the simplest case may comprise that the control can continue unchanged. If however it is found in step S6 that there is no coincidence within the prescribed deviation, a control signal for controlling the aircraft which makes it possible to react to the existing malfunction is generated in step S8. In the simplest case, the method subsequently ends in step S9. There is however the possibility of providing a development of the method (branch A), which is described more specifically below with reference to FIG. 3.

Figure 3:
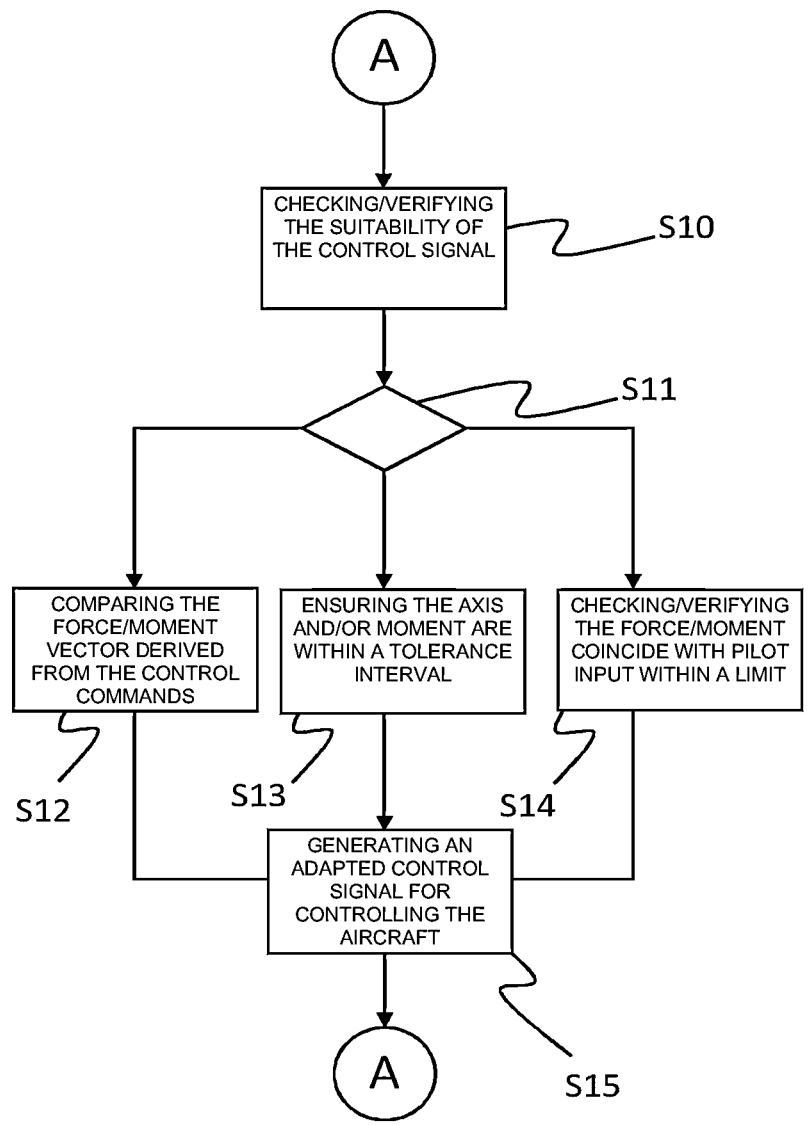
FIG. 3 shows a flow diagram of a development of the method according to FIG. 2.

Since the simple method according to FIG. 2—as described in the introductory part—can lead to a large number of false-positive results, the development according to FIG. 3 provides that, following step S7 or step S8 (cf. FIG. 2), it is checked in step S10, in particular by MON, by a reverse control assignment whether the control commands SB (FIG. 1) during an activation of the flight influencing units 2.1, . . . , 2.N (FIG. 1) of the aircraft lead to a force/moment vector $\tau_{Cmd}$ for the aircraft which is suitable, in particular with regard to direction and/or amount, for a given physical state of the aircraft. For this purpose, the method branches in step S11, so that there are, according to FIG. 3, three possible alternative sequences S12 to S14, which have also been referred to further above as steps i) to iii) and which—as a departure from the simple representation in FIG. 3—can also be performed cumulatively. Subsequently, in step S15, an adapted control signal for controlling the aircraft is generated, to be precise in dependence on a checking result of the respective check according to S12 to S14. After that, the method is continued at branching point A.

In step S12, the force/moment vector derived from the control commands is compared with another force/moment vector $\tau_{MON}$, the force/moment vector $\tau_{MON}$ being determined independently of the force/moment vector $\tau_{Cmd}$, preferably by MON. In step S13, it is checked for the force/moment vector $\tau_{Cmd}$, preferably by MON, whether the axis and/or the amount of a torque contained in the force/moment vector $\tau_{Cmd}$ lies within a prescribed tolerance interval. According to step S14, it is checked for the force/moment vector $\tau_{Cmd}$ once again preferably by MON, whether the force/moment vector $\tau_{Cmd}$ coincides with the pilot input PE (cf. FIG. 1) within a prescribed deviation.

Figure 4:
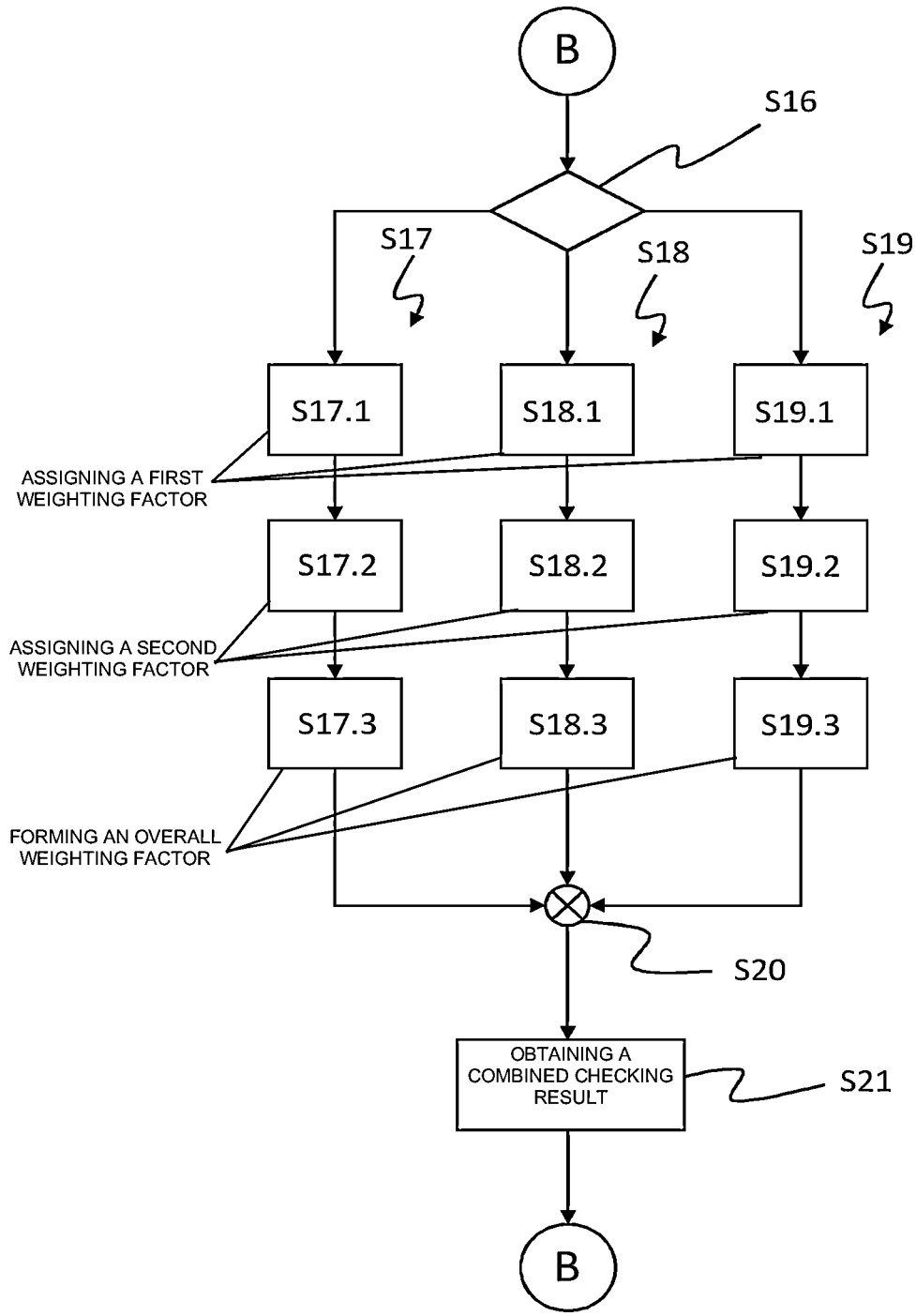
FIG. 4 shows another development of the method according to FIG. 2.

It is shown in FIG. 4 that, within the scope of a development, a number of checking and comparison methods can be used in order to improve the accuracy of the checking, as described in detail further above. In FIG. 4, three different checking/comparison methods are provided, without the invention being restricted to a specific number.

The branch in step S16 branches respectively to one of the checking/comparison methods mentioned. Their sequences are subsequently summarized as step S17, step S18 and step S19. In the case of each of the methods, in a first substep S17.1, S18.1, S19.1, the respective checking/comparison method is assigned a first weighting factor, as described in detail further above. Subsequently, in a second substep S17.2, S18.2, S19.2, each checking/comparison method is assigned a second weighting factor, as likewise described in detail further above. Then, in a third substep S17.3, S18.3, S19.3, the first weighting factor and the second weighting factor for each checking/comparison method are combined to form an overall weighting factor, with which overall weighting factor the associated checking/comparison result is weighted. In particular, it may be provided that, in step S17.3, S19.3, the first weighting factor and the second weighting factor for each checking/comparison method are multiplied by one another. In step S20, the sum is formed from the plurality of weighted checking/comparison results in order to obtain a combined checking result for use in step S21. This combined checking result is subsequently treated further according to step S6, as already described further above on the basis of FIG. 1.

The first weighting factor may be in particular a so-called severity weight, as described in detail further above. The second weighting factor may be in particular a confidence weight, as likewise described in detail further above.

The invention claimed is:

1. A method for controlling an aircraft (1), by which flight influencing units (2.1, . . . , 2.N) of the aircraft (1) are controlled, the method comprising:
   a) supplying the flight influencing units with control commands (SB) via a first channel from a first computer (COM), the control commands (SB) originate from or are derived from a pilot input (PE),
   b) monitoring the control commands (SB) by a second channel and a second computer (MON), the second computer (MON) checking whether the control commands (SB) are suitable for a given physical state of the aircraft (1) and the pilot input (PE),
   c) determining by the second computer (MON) whether a current navigation state of the aircraft (1) coincides with the pilot input (PE), the pilot input (PE) having been transformed into a desired navigation state of the aircraft (1) within a prescribed deviation, and checking, by a reverse control assignment, whether the control commands (SB) during an activation of the flight influencing units (2.1, . . . , 2.N) of the aircraft (1) lead to a first force/moment vector $\tau_{Cmd}$ for the aircraft (1) which is suitable for the given physical state of the aircraft (1), by at least one of:
      i) comparing the first force/moment vector, derived from the control commands (SB), with a second force/moment vector $\tau_{MON}$, said second force/moment vector being determined independently of the first force/moment vector,
      ii) checking for the first force/moment vector whether at least one of an axis or an amount of a torque contained in the first force/moment vector lies within a prescribed tolerance interval, or
      iii) checking for the first force/moment vector whether the first force/moment vector coincides with the pilot input (PE) within the prescribed deviation; and,
   d) generating a control signal or an adapted control signal for controlling the aircraft (1) in dependence on a determination result of the determining in step c) and a checking result of steps i) to iii).

2. The method as claimed in claim 1, wherein, in step c), at least one of the following navigation state attributes of a navigation state is checked:
   a position in flight;
   rotational speeds;
   change in rates of rotation;
   speed with respect to at least one of air or ground;
   altitude; or
   acceleration.

3. The method as claimed in claim 1, wherein the first force/moment vector $\tau_{Cmd}$, derived from the control commands (SB), is given by the relationship:

$$\tau_{Cmd} = \underbrace{\begin{pmatrix} \overline{m}_1^b & \overline{m}_2^b & \cdots & \overline{m}_N^b \\ \overline{f}_1^b & \overline{f}_2^b & \cdots & \overline{f}_N^b \end{pmatrix}}_{K} \underbrace{\begin{pmatrix} \Omega_1^2 \\ \Omega_2^2 \\ \vdots \\ \Omega_N^2 \end{pmatrix}}_{\Omega}$$

with a matrix K, elements m (moment) and f (force) being given by a configuration of the aircraft (1) and the flight influencing units (2.1, . . . , 2.N), and with a setpoint output value vector $\Omega$ with the control commands (SB) of the first computer (COM) for the flight influencing units (2.1, . . . , 2.N).

4. The method as claimed in claim 1, wherein, in step c) a plurality of checking/comparison methods are respectively used in order to obtain a corresponding plurality of checking/comparison results, said plurality of checking/comparison results are subsequently respectively weighted and then combined with one another in order to obtain at least one of a combined determination result or a combined checking result for use in step d).

5. The method as claimed in claim 4, wherein each checking/comparison method from the plurality of checking/comparison methods is assigned at least a first weighting factor and at least a second weighting factor, the first weighting factor and the second weighting factor are combined to form an overall weighting factor for said each checking/comparison method, and an associated checking/comparison result is weighted with said overall weighting factor.

6. The method as claimed in claim 5, wherein the first weighting factor and the second weighting factor for said each checking/comparison method are multiplied by one another.

7. The method as claimed in claim 5, wherein the first weighting factor is a severity weighting factor, which indicates how severe a fault that is detected by a given checking/comparison method is for the aircraft (1) or control thereof.

8. The method as claimed in claim 5, wherein the second weighting factor is a confidence weighting factor, which indicates how accurately a fault that is detected by a given checking/comparison method is quantitatively specified for the aircraft (1) or control thereof.

9. The method as claimed in claim 4, wherein a sum is formed from the plurality of weighted checking/comparison results in order to obtain the combined checking result for use in step d).

10. The method as claimed in claim 4, wherein the plurality of checking/comparison methods are chosen from a group comprising the following methods:
   frequency analysis;
   Kalman filters;
   CBIT and PBIT results;
   out-of-range assessments; or
   expected values from models.

11. A controller (4) for an aircraft (1), the controller comprising:
   a first computer (COM) with a first channel, the first computer (COM) is configured for supplying flight influencing units (2.1, . . . , 2.N) of the aircraft (1) via the first channel with control commands (SB) from the first computer (COM), the control commands (SB) originate from or are derived from a pilot input (PE), and
   a second channel and a second computer (MON), the second computer (MON) is configured to monitor the first computer (COM), wherein the second computer (MON) is configured to check whether the control commands (SB) are suitable for a given physical state of the aircraft (1) and the pilot input (PE),
   the second computer (MON) is configured to determine whether a current navigation state of the aircraft (1) coincides with the pilot input (PE), wherein the pilot input (PE) has been transformed into a desired navigation state of the aircraft (1) within a prescribed deviation, and the second computer (MON) is also configured to generate and output a control signal for controlling the aircraft (1) in dependence on a determination result of the determination;
   wherein the second computer (MON) is also configured to check by a reverse control assignment whether the control commands (SB) during an activation of the flight influencing units (2.1, . . . , 2.N) of the aircraft (1) lead to a first force/moment vector which is suitable for the given physical state of the aircraft (1), in that the second computer (MON) is configured to at least one of:
      i) compare the first force/moment vector, derived from the control commands (SB), with a second force/moment vector, said second force/moment vector is determined independently of the first force/moment vector,
      ii) check for the first force/moment vector whether an axis and/or an amount of a torque contained in the first force/moment vector lies within a prescribed tolerance interval, or
      iii) check for the first force/moment vector whether the first force/moment vector coincides with the pilot input (PE) within the prescribed deviation; and
   the second computer (MON) is configured to generate and output an adapted control signal for controlling the aircraft (1) in dependence on a checking result according to i) to iii).

12. The controller (4) as claimed in claim 11, wherein the second computer (MON) is further configured to use a plurality of checking/comparison methods in order to obtain a corresponding plurality of checking/comparison results, said plurality of checking/comparison results are subsequently respectively weighted and then combined with one another in order to generate at least one of a combined determination result or a combined checking result and output to generate at least one of the control signal or the adapted control signal.

13. The controller (4) as claimed in claim 11, wherein the controller is configured to check at least one of the following navigation state attributes of a navigation state:
   a position in flight;
   rotational speeds;
   change in rates of rotation;
   speed with respect to at least one of air or ground;
   altitude; or
   acceleration.

14. The aircraft (1) comprising the flight influencing units (2.1, . . . , 2.N) and the controller (4) as claimed in claim 11, said controller (4) is operatively connected to the flight influencing units (2.1, . . . , 2.N) and configured to send the control commands (SB) to the flight influencing units (2.1, . . . , 2.N).

15. The aircraft of claim 14, wherein the aircraft is a multirotor aircraft and the flight influencing units are electrically driven drive units.

* * * * *